July 16, 1957  G. H. LEE  2,799,448
CENTRIFUGAL OIL CLEANERS
Filed Jan. 9, 1953
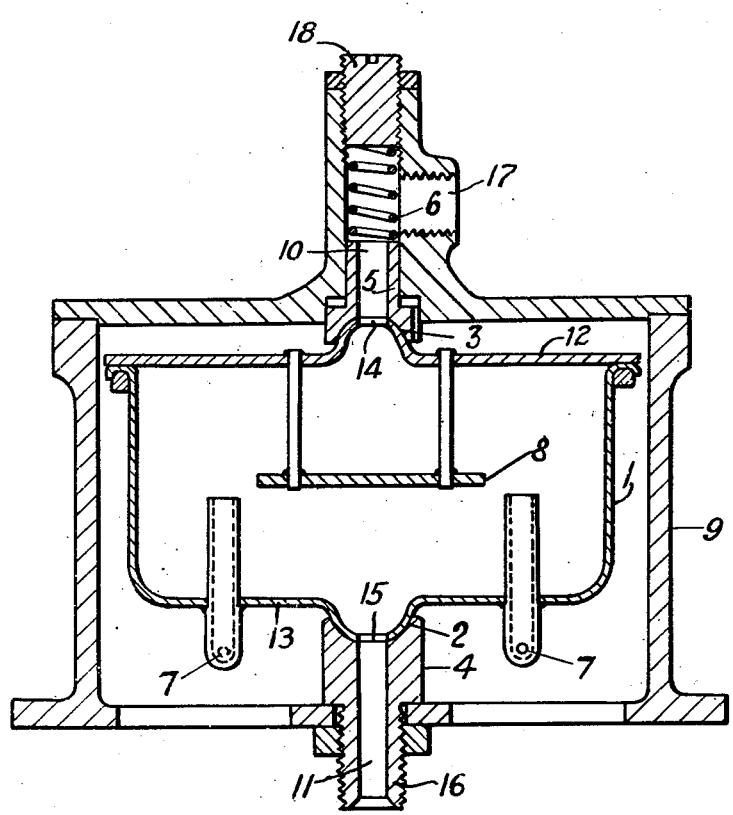
Inventor
George Herbert Lee
by
Pennie, Edmonds, Morton, Barrows and Taylor
Attorneys 2,799,448
Patented July 16, 1957

UNITED STATES PATENT OFFICE 2,799,448

CENTRIFUGAL OIL CLEANERS

George H. Lee, Glasgow, Scotland, assignor, by mesne assignments, to The Glacier Metal Company Limited, Alperton, Wembley, England Application January 9, 1953, Serial No. 330,406

Claims priority, application Great Britain March 4, 1952

5 Claims. (Cl. 233—24)

This invention relates to oil cleaners of the centrifuge type in which a drum to which the oil is fed is mounted in bearings for rotation within a casing and is rotated about a vertical axis by the reaction of at least one oil jet from a nozzle rotating with the drum.

In previous constructions all the oil which enters the drum under pressure is discharged into atmospheric pressure, and, unless a second oil pump is employed to pump the cleaned oil to the place where it is required, the cleaner can only function as a bypass cleaner, so that the major portion of the oil will not pass through the cleaner until it has been circulated several times through the mechanism to be lubricated, and any abrasive particles may circulate with it before their removal. It is an object of the present invention to provide that all the oil passing to the mechanism to be lubricated shall pass through the centrifuge, so that abrasive particles will be taken out in one pass.

In a centrifugal oil cleaner according to the present invention, uncleaned oil enters and most of the cleaned oil leaves the drum through axial passages formed in at least one of the bearings.

The bearings may be formed with depressions, projections on the drum engaging the seats. At least one of the bearings may be movable axially and spring-urged in the direction towards the drum. The bearings may be formed with spherical or differently shaped seats, the corresponding projections on the drum being formed to mate with the particular seats employed.

The bearings may be arranged to take the end thrust of the drum.

Both bearings may be hollow, oil being fed to the drum through one of the bearings and leaving the drum through the other bearing.

The stress of the spring urging the respective bearing towards the drum may be adjustable.

A baffle in the form of a disc may be fixed within the drum directly between the bearings.

As illustrated in the accompanying drawing, the centrifugal oil cleaner comprises a stationary casing 9 provided with upper and lower bearings 5, 4, respectively, having axial passages 10 and 11, respectively, for the flow of oil axially through the bearings. A rotatable drum 1 located inside the casing 9 includes a top 12 and a bottom 13, respectively provided with upper and lower axial bearings 3, 2 respectively engaging the bearings 5 and 4 of the casing 9, the bearings of the drum having axial oil passages 14 and 15 respectively registering with the passages 10 and 11 of the bearings of the casing 9. An oil inlet pipe connection 16 is connected with the passage in one of the bearings of the casing, e. g. the bearing 4, and an oil outlet pipe connection 17 is connected with the passage in the other bearing, e. g. the bearing 5, for the delivery of clean oil from the drum 1 under pressure.

The bearings 4, 5 may be provided with recesses facing towards the inside of the casing, the bearings 2, 3 of the drum 1 comprising projections respectively engaging in the recesses of the casing bearings. The drum bearings 2, 3 may be in the form of convex projections at the bottom and top respectively of the drum 1 engaging concave recesses in the respective casing bearings 4, 5, as shown in the drawing. One of the casing bearings, for instance, the bearing 5, is movable axially with respect to the casing, a spring 6 seated against a screw 18 biasing the movable bearing in a direction towards the drum 1. The stress of the spring 6 urging the bearing 5 towards the drum is adjustable by the screw 18. The centrifugal cleaner includes reaction nozzles 7, open at their upper ends and supplied with oil from the interior of the drum 1, and a baffle disc 8 arranged between the upper and lower bearings.

In practice, oil is pumped into the drum 1 through the hollow bearing 4 and jets of oil issuing from the nozzle 7 cause the drum 1 to rotate by reaction. As the nozzles 7 can only pass a small proportion of the oil being pumped into the drum, most of the oil, after being centrifuged, leaves the drum by way of the bearing 5. The baffle plate 8 prevents oil from flowing directly from the bearing 4 to the bearing 5 without being subjected to centrifugal action.

In the construction illustrated, a balance is preferably maintained by arranging that the projected area of the bottom bearing is greater than that of the top bearing to compensate for the weight of the drum and the contained oil, the arrangement being such that oil will leak from both bearings at the same time when it has reached a determinate pressure. The leakage pressure is determined by adjusting the amount by which the spring 6 is compressed i. e., by regulating the screw 18. The slidable bearing 5 thus forms a pressure relief valve.

What is claimed is:

1. A centrifugal oil cleaner comprising a stationary casing provided with upper and lower bearings having axial passages for the flow of oil axially through the bearings, a rotatable drum located inside the casing and having upper and lower axial bearings respectively engaging in the bearings of the casing and mounting the drum for rotation on an upright axis in the casing, the bearings of the drum having axial oil passages respectively registering with the passages of the casing bearings, an oil inlet pipe connection connected with the passage in one of the bearings of the casing for the delivery of oil to be cleaned under pressure to the interior of said drum, an oil outlet pipe connection connected with the passage in the other bearing of the casing for the delivery of clean oil from the drum under pressure to a mechanism to be lubricated, and at least one reaction jet nozzle carried by said drum through which oil flows under pressure from the interior of the drum into the casing and effects rotation of the drum to centrifuge and clean the oil delivered to the drum, the oil outlet passages in the drum and casing bearings and the oil outlet pipe connection being arranged to deliver the major portion of the oil introduced into the drum through the inlet pipe connection.

2. A centrifugal oil cleaner as claimed in claim 1, in which the casing bearings are provided with recesses facing toward the inside of the casing, and in which the bearings of the drum comprise projections respectively engaging in the recesses of the casing bearings.

3. A centrifugal oil cleaner as claimed in claim 1, in which at least one of the casing bearings is movable axially with respect to the casing, and a spring biasing said movable bearing in a direction toward the drum.

4. A centrifugal oil clearer as claimed in claim 1, in which at least one of the casing bearings is movable axially with respect to the casing, a spring biasing said movable bearing in a direction toward the drum, and means for adjusting the stress applied by the spring to the axially movable bearing.

5. A centrifugal oil cleaner comprising a stationary casing provided with upper and lower bearings having axial passages for the flow of oil axially through the bearings, a rotatable drum located inside the casing and having a top and bottom provided with upper and lower axial bearings, respectively, said upper and lower bearings of the drum respectively engaging in the bearings of the casing and mounting the drum for rotation on an upright axis in the casing, the bearings of the drum having axial oil passages respectively registering with the passages of the casing bearings, the upper and lower engaging bearings of the casing and drum respectively comprising a convex projection fitting rotatably in a concave recess arranged axially with respect to the drum, the drum bearings respectively constituting a portion of the top and bottom of the drum, an oil inlet pipe connection connected with the passage in one of the bearings of the casing for the delivery of oil to be cleaned under pressure to the interior of said drum, an oil outlet pipe connection connected with the passage in the other bearing of the casing for the delivery of clean oil from the drum under pressure to a mechanism to be lubricated, at least one reaction jet nozzle carried by said drum through which oil flows under pressure from the interior of the drum into the casing and effects rotation of the drum to centrifuge and clean the oil delivered to the drum, the oil outlet passages in the drum and casing bearings and the oil outlet pipe connection being arranged to deliver the major portion of the oil introduced into the drum through the inlet pipe connection, one of the casing bearings being movable axially with respect to the casing, a spring biasing the movable bearing toward the drum, and the arrangement of the bearings being such that oil will leak between the drum and casing bearings when the oil pressure in the drum reaches a predetermined pressure, whereby the spring biased movable bearing of the casing constitutes a pressure relief valve.

References Cited in the file of this patent
UNITED STATES PATENTS

| | | |
|---|---|---|
| 1,714,658 | Carter | May 28, 1929 |
| 2,650,022 | Fulton | Aug. 25, 1953 |